(12) United States Patent
Shan (10) Patent No.: US 11,142,035 B2
(45) Date of Patent: Oct. 12, 2021

(54) HEATING, VENTILATION, AND AIR CONDITIONING SYSTEM

(71) Applicant: DENSO International America, Inc., Southfield, MI (US)

(72) Inventor: Zhiwei Shan, Rochester, MI (US)

(73) Assignee: DENSO International America, Inc., Southfield, MI (US)

( * ) Notice: Subject to any disclaimer, the term of this patent is extended or adjusted under 35 U.S.C. 154(b) by 78 days.

(21) Appl. No.: 16/284,549

(22) Filed: Feb. 25, 2019

(65) Prior Publication Data

US 2020/0269650 A1   Aug. 27, 2020

(51) Int. Cl.
*B60H 1/00* (2006.01)
*B60H 1/32* (2006.01)

(52) U.S. Cl.
CPC ............ *B60H 1/00028* (2013.01); *B60H 1/32* (2013.01); *B60H 2001/00078* (2013.01); *B60H 2001/3291* (2013.01)

(58) Field of Classification Search
CPC ............... B60H 1/0023; B60H 1/3291; B60H 1/00064; B60H 1/32; B60H 1/00071; B60H 1/00557; B60H 1/3205; B60H 1/00921; B60H 2001/00078; B60H 2001/3291; B60H 2001/00178; B60H 1/00
See application file for complete search history.

(56) References Cited

U.S. PATENT DOCUMENTS

| 5,309,731 | A | * | 5/1994 | Nonoyama | ........ | B60H 1/00849 62/244 |
| 2004/0089004 | A1 | * | 5/2004 | Ogiso | ........ | F25B 5/02 62/203 |
| 2009/0071178 | A1 | | 3/2009 | Major et al. | | |
| 2010/0096108 | A1 | | 4/2010 | Castagne | | |
| 2016/0272037 | A1 | | 9/2016 | Gesell et al. | | |
| 2017/0087956 | A1 | * | 3/2017 | Graaf | ........ | B60H 1/00921 |
| 2017/0096048 | A1 | | 4/2017 | Larson et al. | | |
| 2018/0022188 | A1 | | 1/2018 | Kakizaki et al. | | |
| 2019/0039435 | A1 | * | 2/2019 | Hasan | ........ | B60H 1/00849 |

FOREIGN PATENT DOCUMENTS

EP           2679419 A1    1/2014

* cited by examiner

*Primary Examiner* — Harry E Arant
(74) *Attorney, Agent, or Firm* — Harness, Dickey & Pierce, P.L.C.

(57) ABSTRACT

A heating, ventilation, and air conditioning (HVAC) system for a vehicle may include a housing, a first heat exchanger, a first door, and a second heat exchanger. The housing may include a first inlet branch, a second inlet branch, and an outlet branch. The first door may be adjacent the first heat exchanger and may move from a first position preventing flow to the first heat exchanger to a second position permitting flow to the first heat exchanger. The second heat exchanger may be positioned downstream of the first heat exchanger.

20 Claims, 6 Drawing Sheets

HEATING, VENTILATION, AND AIR CONDITIONING SYSTEM

FIELD

The present disclosure relates to a heating, ventilation, and air conditioning (HVAC) system and, more specifically, to an HVAC system that allows maximum recirculation.

BACKGROUND

This section provides background information related to the present disclosure which is not necessarily prior art.

Automotive heating, ventilation, and air conditioning (HVAC) systems require ample heat power in order to keep a vehicle cabin warm in cold outdoor temperatures. One method to reduce the heat power needed has been to utilize warm recirculation air from the vehicle cabin instead of taking in cold fresh air from the outside. However, if the warm recirculation air contains too much moisture, for example from passenger breath or melted snow on shoes, window fogging can occur. Window fogging in the winter months can cause low or impaired visibility and is a safety concern. As such, an HVAC system that maximizes the use of recirculation air while reducing window fogging would be desirable.

SUMMARY

This section provides a general summary of the disclosure, and is not a comprehensive disclosure of its full scope or all of its features.

An example heating, ventilation, and air conditioning (HVAC) system for a vehicle according to the present disclosure may include a housing, a first heat exchanger, a first door, and a second heat exchanger. The housing may include a first inlet branch, a second inlet branch, and an outlet branch. The first door may be adjacent the first heat exchanger and may move from a first position preventing flow to the first heat exchanger to a second position permitting flow to the first heat exchanger. The second heat exchanger may be positioned downstream of the first heat exchanger.

In some embodiments, the HVAC system may further include a second door adjacent the second heat exchanger. The second door may move from a first position preventing flow to the second heat exchanger to a second position permitting flow to the second heat exchanger.

In some embodiments, the second door may be in the first position preventing flow to the second heat exchanger when a target temperature is less than a temperature of a vehicle cabin.

In some embodiments, the first inlet branch may receive air from outside the vehicle. The second inlet branch may receive recirculation air from a vehicle cabin.

In some embodiments, the HVAC system may further include a wall separating the housing between an outside air side and a recirculation air side upstream of the first heat exchanger.

In some embodiments, the first door may be on the outside air side of the housing.

In some embodiments, the HVAC system may further include a bypass passage. When the first door is in the first position preventing flow to the first heat exchanger, the flow may be directed to the bypass passage.

In some embodiments, the HVAC system may further include a mixing chamber disposed between the first heat exchanger and the second heat exchanger where the air from outside of the vehicle may be mixed with the air from the vehicle cabin.

In some embodiments, the first door may be in the first position when an external temperature is less than a temperature threshold.

In some embodiments, the temperature threshold may be about −5 degrees Celsius.

In some embodiments, the first heat exchanger may be an evaporator.

In some embodiments, the second heat exchanger may be a heat pump cabin condenser.

In some embodiments, the HVAC system may further include a refrigeration loop connecting the refrigerant from the first heat exchanger with the second heat exchanger.

In some embodiments, the refrigeration loop may further include a compressor, a front condenser, and a third heat exchanger.

In some embodiments, the first heat exchanger may be a first evaporator and the third heat exchanger may be a second evaporator.

An example control system for a heating, ventilation, and air condition (HVAC) system for a vehicle according to the present disclosure includes a control module. The control module may be in communication with the first door actuator and the second door actuator. The control module may activate the first door actuator to move a first door from a first position preventing flow to a first heat exchanger to a second position permitting flow to the first heat exchanger. The control module may activate the second door actuator to move a second door from a first position preventing flow to a second heat exchanger to a second position permitting flow to the second heat exchanger. When the control module activates the first door actuator to position the first door in the first position, airflow may be routed around the first heat exchanger by a bypass passage.

In some embodiments, the control module may activate the first door actuator to position the first door in the first position when an external temperature of the vehicle is less than a temperature threshold.

In some embodiments, the temperature threshold may be about −5 degrees Celsius.

In some embodiments, the control module may receive the external temperature from an outdoor temperature sensor.

In some embodiments, the control module may activate the second door actuator to position the second door in the first position when a target temperature is less than a temperature inside a vehicle compartment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module," the term "unit," or the term "controller" may be replaced with the term "circuit." The term "module" or the term "unit" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module or unit may include one or more interface circuits. In some examples, the interface circuits may include wired or wireless interfaces that are connected to a local area network (LAN), the Internet, a wide area network (WAN), or combinations thereof. The functionality of any given module or unit of the present disclosure may be distributed among multiple modules or units that are connected via interface circuits. For example, multiple modules or units may allow load balancing. In a further example, a server (also known as remote, or cloud) module or unit may accomplish some functionality on behalf of a client module or unit.

The term code, as used above, may include software, firmware, and/or microcode, and may refer to programs, routines, functions, classes, data structures, and/or objects. The term shared processor circuit encompasses a single processor circuit that executes some or all code from multiple modules or units. The term group processor circuit encompasses a processor circuit that, in combination with additional processor circuits, executes some or all code from one or more modules or units. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules or units. The term group memory circuit encompasses a memory circuit that, in combination with additional memories, stores some or all code from one or more modules or units.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MAT-LAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The heating, ventilation, and air conditioning (HVAC) system of the present disclosure maximizes the use of recirculation air while reducing window fogging when and outdoor temperature is low. The HVAC intakes a high percentage of warm recirculation air from the cabin to reduce the cabin heating needs and, at the same time, utilizes the vehicle refrigeration system to remove water moisture so that the vehicle's window will remain clear (i.e., no window fogging). As such, the HVAC system reduces the vehicle cabin heating power requirements and, where applicable, improves driving range in electric vehicles.

Referring to FIGS. 1-4 an example heating, ventilation, and air conditioning (HVAC) system 10 according to the present disclosure is illustrated. The HVAC system 10 may be installed in a vehicle. The vehicle may be a passenger vehicle or any other suitable vehicle, such as any recreational vehicle, mass transit vehicle, military vehicle, construction vehicle/equipment, watercraft, aircraft, etc.

The HVAC system 10 may include a motor 14, at least one first heat exchanger, such as, for example, an evaporator, 18, and at least one second heat exchanger, such as, for example, a heat pump cabin condenser 22 disposed within a housing 26. The housing 26 may have multiple inlet branches 30 and at least one outlet branch 34. The housing 26 may be split into multiple sections by a dividing wall 38. In this example, the dividing wall 38 may extend from the evaporator 18 and through the motor 14, such that air flowing in from the inlet branches 30 remains separate.

A first door 42 may be positioned adjacent to the evaporator 18 and may move between a first position blocking airflow to the evaporator 18 and a second position allowing airflow to the evaporator 18. A second door 46 may be positioned adjacent to the heat exchanger 22 and may move between a first position blocking airflow to the heat exchanger 22 and a second position allowing airflow to the heat exchanger 22.

The housing 26, wall 38, first door 42, and second door 46 may define an airflow path through the HVAC system 10. Recirculated air 50 from within a vehicle compartment, or vehicle cabin, may be received by one of the inlet branches 30. The recirculated air 50 may be routed through the motor 14 and along the wall 38 to the evaporator 18. When the recirculated air 50 passes through the evaporator 18, the recirculated air 50 is mixed in a mixing compartment 54.

External air 58 from outside the vehicle may be received in another of the inlet branches 30. The external air 58 may be routed through the motor 14 and along the wall 38 to the evaporator 18. If the first door 42 is in the second position, the external air 58 passes through the evaporator 18 and into the mixing compartment 54. If the first door 42 is in the first position, the external air 58 is routed through a first bypass passage 62 to bypass the evaporator 18 and flow directly to the mixing compartment 54.

The recirculated air 50 and the external air 58 are mixed in the mixing compartment 54 to generate mixed air 66. If the second door 46 is in the second position, the mixed air 66 flows through the heat exchanger 22 and into the outlet branch 34. If the second door 46 is in the first position, the mixed air 66 flows through a second bypass passage 70 to bypass the heat exchanger 22 and flow directly to the outlet branch 34. In the outlet branch 34, the mixed air 66 flows to the passenger compartment or cabin as outlet air 74.

The evaporator 18 removes heat and humidity from air passing therethrough. In operation, cold, low-pressure liquid refrigerant enters the evaporator 18. Warm air from the vehicle cabin or compartment passes through the evaporator (for example, by action of a blower fan). The cooler refrigerant flowing inside the evaporator absorbs heat from the warm air. At the same time, humidity in the air condenses on the cool surface of the evaporator, and eventually drips out of a drain tube to outside the vehicle.

For example, the evaporator 18 temperature may be approximately 2° Celsius (C) (±1° C.). As air from the passenger cabin 50 passes through the evaporator 18, the evaporator 18 cools the air down to 2° C. and removes its water moisture (or humidity). Thus the air exiting the evaporator 18 is much cooler (for example approximately 2° C.) and dryer than the air in the passenger cabin 50.

The heat exchanger 22 may be a heat pump cabin condenser or another heating heat exchanger. The heat exchanger 22 may receive mixed air 66 and heats the mixed air 66 to a target temperature that is specified by a user or driver. The air exiting the heat exchanger 22 is at the target temperature and is released back to the vehicle cabin as output air 74.

Figure 1:
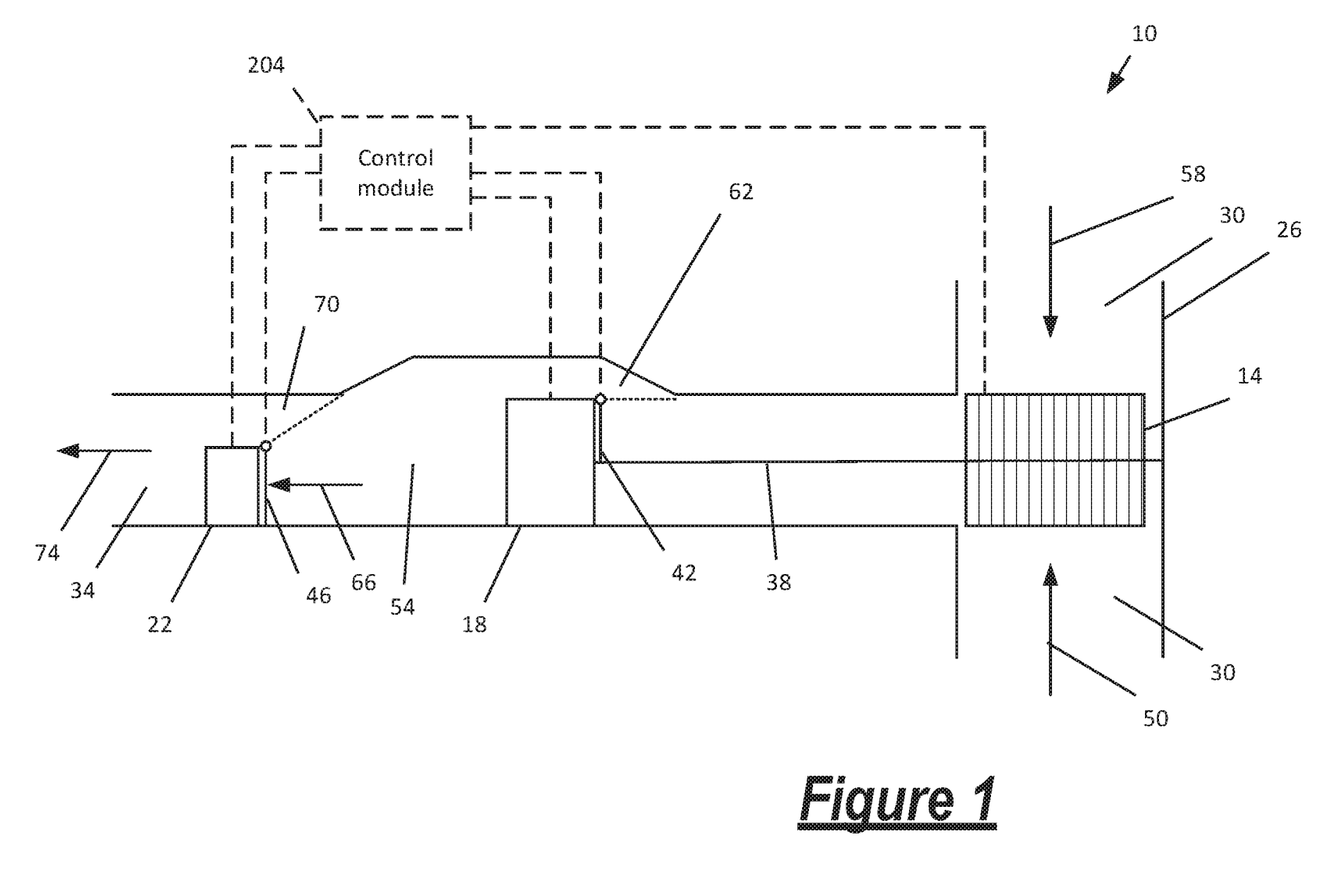
FIG. 1 is a schematic view of a heating, ventilation, and air conditioning (HVAC) system according to the present disclosure.
Figure 2:
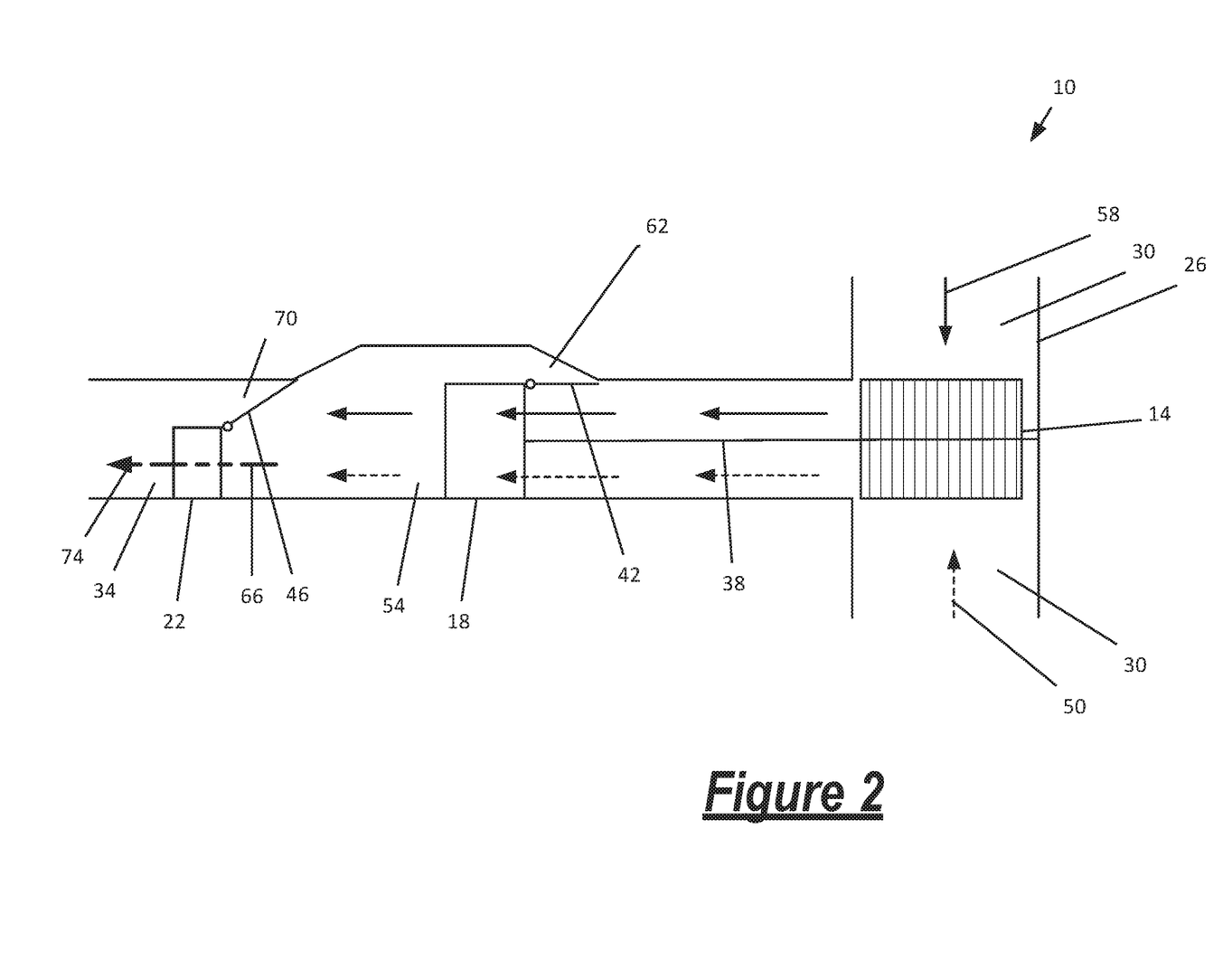
FIG. 2 is a schematic view of a portion of the HVAC system of claim 1 in an example configuration.

Now referring specifically to FIG. 2, an example configuration for normal cold weather operation is illustrated. For example, FIG. 2 may illustrate the configuration when an ambient temperature is at least a threshold temperature, for example −5° C., or greater. As previously stated, the housing 26, wall 38, first door 42, and second door 46 may define the airflow path through the HVAC system 10. Recirculated air 50 from within the vehicle compartment, or vehicle cabin, may be received by one of the inlet branches 30. The recirculated air 50 may be routed through the motor 14 and along the wall 38 to the evaporator 18. When the recirculated air 50 passes through the evaporator 18, the recirculated air 50 is mixed in the mixing compartment 54.

External air 58 from outside the vehicle may be received in another of the inlet branches 30. The external air 58 may be routed through the motor 14 and along the wall 38 to the evaporator 18. Since the ambient temperature in this example is greater than the threshold temperature, the first door 42 is in the second position and the external air 58 passes through the evaporator 18 and into the mixing compartment 54.

The recirculated air 50 and the external air 58 are mixed in the mixing compartment 54 to generate mixed air 66. Since the temperature in the passenger compartment in this example is less than a target temperature, the second door 46 is in the second position, allowing the mixed air 66 to flow through the heat exchanger 22 and into the outlet branch 34. In the outlet branch 34, the mixed air 66 flows to the passenger compartment or cabin as outlet air 74.

Figure 3:
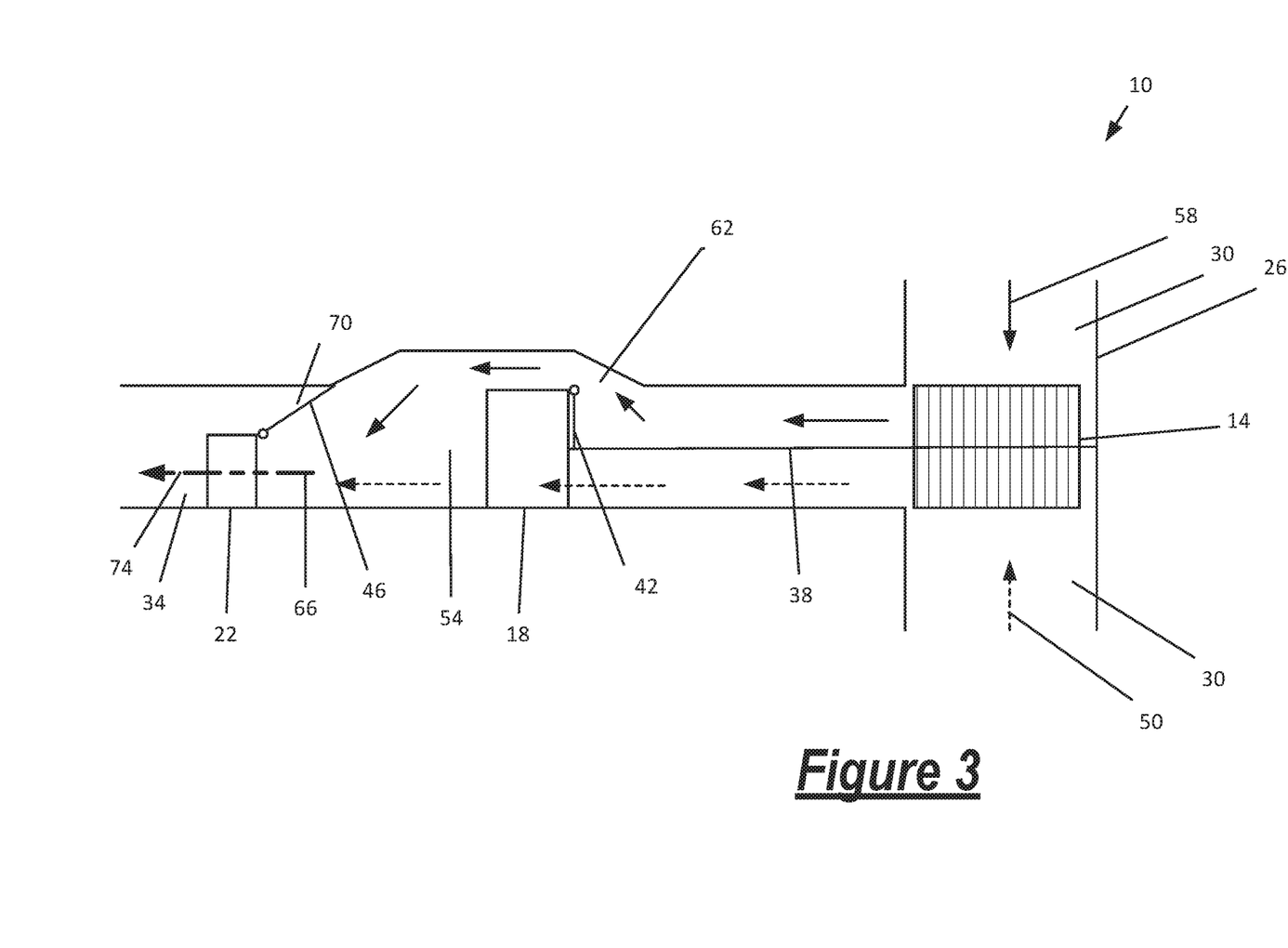
FIG. 3 is a schematic view of a portion of the HVAC system of claim 1 in another example configuration.

Now referring specifically to FIG. 3, an example configuration for extreme cold weather operation is illustrated. For example, FIG. 3 may illustrate the configuration when an ambient temperature is less than the threshold temperature, for example −5° C. As previously stated, the housing 26, wall 38, first door 42, and second door 46 may define the airflow path through the HVAC system 10. Recirculated air 50 from within the vehicle compartment, or vehicle cabin, may be received by one of the inlet branches 30. The recirculated air 50 may be routed through the motor 14 and along the wall 38 to the evaporator 18.

The evaporator 18 decreases the temperature of the recirculated air 50 to the temperature of the evaporator, for example approximately 2° C. (±1° C.) to remove water moisture from the air. When the recirculated air 50 passes through the evaporator 18, the recirculated air 50 is mixed in the mixing compartment 54.

External air 58 from outside the vehicle may be received in another of the inlet branches 30. The external air 58 may be routed through the motor 14 and along the wall 38 to the evaporator 18. Since the ambient temperature in this example is less than the threshold temperature, the first door 42 is in the first position, and the external air 58 is routed through the first bypass passage 62 to bypass the evaporator 18 and flow directly to the mixing compartment 54.

The external air 58 is routed through the first bypass passage to avoid passing through the evaporator 18. Since the external air 58 is very cold (i.e., less than the threshold, for example −5° C.), there is likely no water moisture in the air, and passing the external air 58 through the evaporator 18 would provide no advantage. Additionally, if the external air 58 was sent through the evaporator 18, the temperature of the external air 58 could actually decrease the temperature of the evaporator 18, leading to durability issues in the HVAC system 10. For example, the temperature of the external air 58 could cause the temperature of the refrigerant in the evaporator 18 to lose head and condense, causing liquid refrigerant blow back to the compressor and reducing compressor durability.

The recirculated air 50 and the external air 58 are mixed in the mixing compartment 54 to generate mixed air 66. Since the temperature in the passenger compartment in this example is less than a target temperature, the second door 46 is in the first position, and the mixed air 66 flows through the second bypass passage 70 to bypass the heat exchanger 22 and flow directly to the outlet branch 34. In the outlet branch 34, the mixed air 66 flows to the passenger compartment or cabin as outlet air 74.

Figure 4:
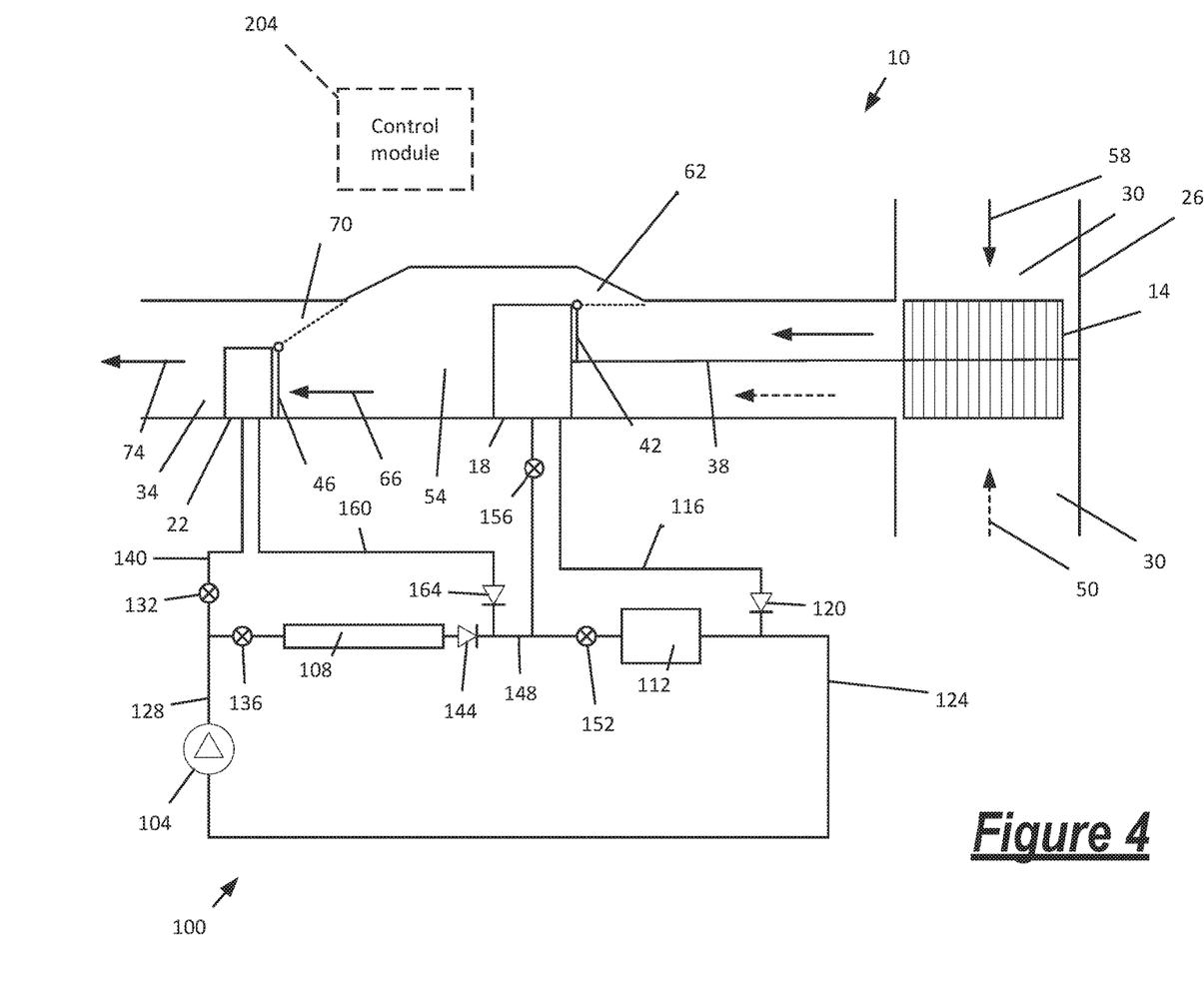
FIG. 4 is a schematic view of a portion of another heating, ventilation, and air conditioning (HVAC) system according to the present disclosure.

Now referring to FIG. 4, the HVAC system 10 may additionally include a secondary refrigeration loop 100 having a compressor 104, a front condenser 108, and a third heat exchanger, such as, for example, a second evaporator, 112. The airflow through the HVAC system 10 may operate as described above with respect to FIGS. 1-3. However, the secondary refrigeration loop 100 allows heat absorbed by the evaporator 18 to be transferred to the heat exchanger 22 to reduce the vehicle cabin heating needs and conserve power.

For example the refrigerant (having absorbed heat from the recirculated air 50 in the evaporator 18 flows through a line 116 and through a valve 120. For example, the valve 120 may be a non-return valve. The heated refrigerant may pass through a line 124 to the compressor 104. The compressor 104 may compress the refrigerant. A line 128 leaving compressor 104 may transport the heated refrigerant to valves 132 and 136. If valve 132 is open and valve 136 is closed, the refrigerant may be transported to heat exchanger 22 through line 140.

If valve 132 is closed and valve 136 is open, the refrigerant is transported to the front condenser 108. The front condenser 108 may convert the refrigerant to a liquid through a cooling process. The refrigerant passes through a valve 144 and to line 148 upon exiting the front condenser 108. For example, the valve 144 may be a non-return valve. If a switch 152 is open and a switch 156 is closed, the refrigerant may be transported to the second evaporator 112 and return to line 124. If the switch 152 is closed and the switch 156 is open, the refrigerant may be transported back to the evaporator 18.

The refrigerant may be transported from the heat exchanger 22 through line 160. The refrigerant may pass through a valve 164 to line 148. For example, valve 164 may be a non-return valve. In line 148, the refrigerant, as previously described, may be transported to either the evaporator 18 or the second evaporator 112 based on the state of switches 152 and 156. In this way, waste heat from evaporator 18 or evaporator 112 can be reserved and sent back to heat exchanger 12 and the vehicle cabin.

Figure 5:
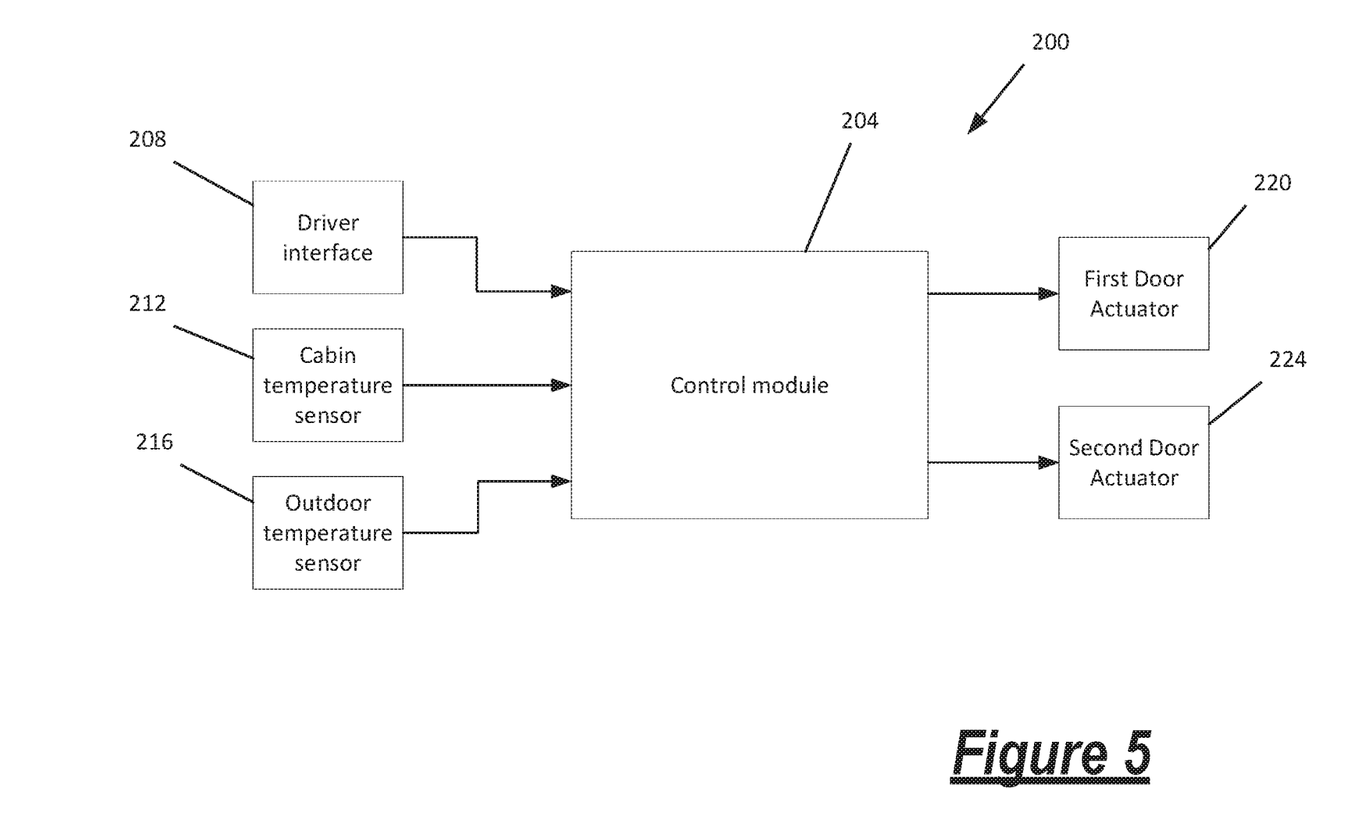
FIG. 5 is a schematic view of a control system for a heating, ventilation, and air conditioning (HVAC) system according to the present disclosure.

Now referring to FIG. 5, a control system 200 for controlling airflow through the HVAC system is illustrated. The control system 200 may include a control module 204. In this application, the term "module" or "unit" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The control module 204 may communicate with a driver interface 208, a cabin temperature sensor 212, and an outdoor temperature sensor 216, among other things. The driver interface 208 may be a touch-screen, a series of knobs or buttons, or any other interface allowing the driver to communicate settings to the control module 204. The driver interface 208 may transmit temperature settings or target temperatures to the control module 204 to use in controlling the HVAC system 10.

The cabin temperature sensor 212 may be disposed in the passenger cabin or passenger compartment and may record temperature readings of the air within the passenger cabin or passenger compartment. The control module 204 may receive the temperature readings from the cabin temperature sensor 212 to use in controlling the HVAC system 10.

The outdoor temperature sensor 216 may be disposed on an exterior (or other reasonable location such as, for example, in branch 30 through which outside air 58 flows) of the vehicle and may record temperature readings of the external air outside of the vehicle. The control module 204 may receive the temperature readings from the outdoor temperature sensor 216 to use in controlling the HVAC system 10.

The control module 204 may use the data from the driver interface 208, the cabin temperature sensor 212, and the outdoor temperature sensor 216 to control a first door actuator 220 and a second door actuator 224. The first door actuator 220 and the second door actuator 224 control the positions of the first door 42 and the second door 46, respectively. For example, the first door actuator 220 may move the first door 42 from the first position to the second position and from the second position to the first position. The second door actuator 224 may move the second door 46 from the first position to the second position and from the second position to the first position.

For example, the control module 204 may compare a temperature from the outdoor temperature sensor 216 with a temperature threshold, as previously described, to control the first door 42. The temperature threshold may define an extremely cold weather condition. For example only, the temperature threshold may be set to approximately −5° C. (±1° C.). If the temperature from the outdoor temperature sensor 216 is at least the temperature threshold, or greater, the control module 204 may command the first door actuator 220 to move the first door 42 to the second position, allowing flow through the evaporator 18. If the temperature from the outdoor temperature sensor 216 is less than the temperature threshold, the control module 204 may command the first door actuator 220 to move the first door 42 to the first position, blocking flow through the evaporator 18 and routing flow through the bypass passage 62.

In a further example, the control module 204 may compare a temperature from the cabin temperature sensor 212 with a target temperature from the driver interface 208, as previously described, to control the second door 46. If the temperature from the cabin temperature sensor 212 is at least the target temperature, or greater, the control module 204 may command the second door actuator 224 to move the second door 46 to the first position, blocking flow through the heat exchanger 22 and routing flow through the bypass passage 70. If the temperature from the cabin temperature sensor 212 is less than the target temperature, the control module 204 may command the second door actuator 224 to move the second door 46 to the second position, allowing flow through the heat exchanger 22.

Figure 6:
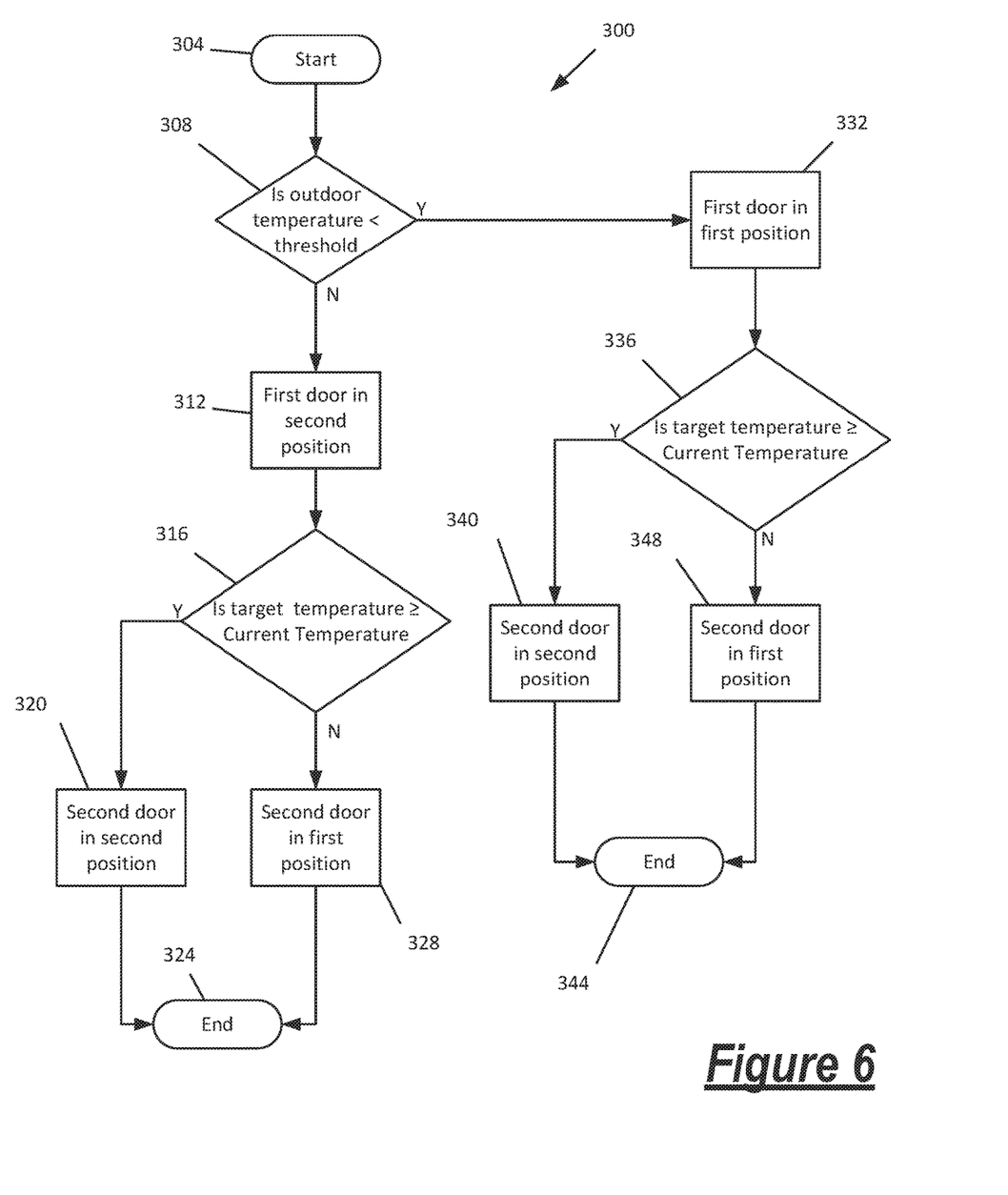
FIG. 6 is a flow chart illustrating a method for controlling airflow through a heating, ventilation, and air conditioning (HVAC) system according to the present disclosure.

Now referring to FIG. 6, a method 300 for controlling an HVAC system 10 is illustrated. Method 300 begins at 304. At 308, method 300 determines whether an outdoor temperature is less than a temperature threshold. For example only, the temperature threshold may be approximately −5° C. (±1° C.). As previously described, the control module 204 may receive the outdoor temperature from the outdoor temperature sensor 216 and may compare the outdoor temperature to the temperature threshold.

If false at 308 (i.e., if it is not an extreme cold weather condition), the first door 42 is moved to the second position at 312, allowing outside air 58 to flow through the evaporator 18. For example, the control module 204 may command the first door actuator 220 to move the first door 42 to the second position.

At 316, the method 300 determines whether a target temperature is greater than or equal to a current temperature (or, in some cases, a current temperature less a threshold, such as 5° C.). For example, the control module 204 may receive the current temperature from the cabin temperature sensor 212 and may receive the target temperature from the driver interface 208 for comparison.

If true at 316, the second door 46 is moved to the second position, allowing flow of mixed air 66 through the heat exchanger 22 at 320. For example, the control module 204 may command the second door actuator 224 to move the second door 46 to the second position. The method then ends at 324.

If false at 316, the second door 46 is moved to the first position, blocking flow of mixed air 66 from the heat exchanger 22 and directing flow to the bypass passage 70 at 328. For example, the control module 204 may command the second door actuator 224 to move the second door 46 to the first position. The method then ends at 324.

If true at 308, the first door 42 is moved to the first position, blocking flow through the evaporator 18 and directing flow to the bypass passage 62 at 332. For example, the control module 204 may command the first door actuator 220 to move the first door 42 to the first position.

At 336, the method 300 determines whether a target temperature is greater than or equal to a current temperature (or, in some cases, a current temperature less a threshold, such as 5° C.). For example, the control module 204 may receive the current temperature from the cabin temperature sensor 212 and may receive the target temperature from the driver interface 208 for comparison.

If true at 336, the second door 46 is moved to the second position, allowing flow of mixed air 66 through the heat exchanger 22 at 340. For example, the control module 204 may command the second door actuator 224 to move the second door 46 to the second position. The method then ends at 344.

If false at 336, the second door 46 is moved to the first position, blocking flow of mixed air 66 from the heat exchanger 22 and directing flow to the bypass passage 70 at 348. For example, the control module 204 may command the second door actuator 224 to move the second door 46 to the first position. The method then ends at 344.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, ventilation, and air conditioning (HVAC) system for a vehicle comprising:
   a housing having a first inlet branch, a second inlet branch, and an outlet branch;
   a first heat exchanger;
   a wall extending continuously from the first inlet branch and the second inlet branch to an entrance of the first heat exchanger, the wall dividing the housing into a first flow chamber and a second flow chamber, the first flow chamber having a cross-sectional area equal to a cross-sectional area of the second flow chamber, the flow from the first inlet branch moving through the first flow chamber and the flow from the second inlet branch moving through the second flow chamber;
   a first door adjacent the first heat exchanger and pivoting about a first axis, the first axis being separated from the wall, the first door moving from a first position to a second position, the first position preventing flow from the second inlet branch to the first heat exchanger and routing the flow around the heat exchanger, the second position permitting flow from the second inlet branch to the first heat exchanger, the first door contacting the wall when in the first position and being separated from the wall in the second position, the first door contacting the housing in the second position and extending from the housing to the heat exchanger to define the second flow chamber and to provide separated flow from the first inlet branch and the second inlet branch into the heat exchanger, the cross-sectional area of the first flow chamber being equal to the cross-sectional area of the second flow chamber at an entrance to the heat exchanger; and
   a second heat exchanger positioned downstream of said first heat exchanger.

2. The HVAC system of claim 1, further comprising a second door adjacent the second heat exchanger and moving from a first position preventing flow to the second heat exchanger to a second position permitting flow to the second heat exchanger.

3. The HVAC system of claim 2, wherein the second door is in the first position preventing flow to the second heat exchanger when a target temperature is less than a temperature of a vehicle cabin.

4. The HVAC system of claim 1, wherein the first inlet branch receives air from outside the vehicle, and the second inlet branch receives recirculation air from a vehicle cabin.

5. The HVAC system of claim 4, wherein the wall separates the housing between an outside air side and a recirculation air side upstream of the first heat exchanger.

6. The HVAC system of claim 5, wherein the first door is on the outside air side of the housing.

7. The HVAC system of claim 6, further comprising a bypass passage, wherein when the first door is in the first position preventing flow to the first heat exchanger, the flow is directed to the bypass passage.

8. The HVAC system of claim 4, further comprising a mixing chamber disposed between the first heat exchanger and the second heat exchanger where the air from outside of the vehicle is mixed with the air from the vehicle cabin.

9. The HVAC system of claim 1, wherein the first door is in the first position when an external temperature is less than a temperature threshold.

10. The HVAC system of claim 9, wherein the temperature threshold is about −5 degrees Celsius.

11. The HVAC system of claim 1, wherein the first heat exchanger is an evaporator.

12. The HVAC system of claim 1, wherein the second heat exchanger is a heat pump cabin condenser.

13. The HVAC system of claim 1, further comprising a refrigeration loop connecting the refrigerant from the first heat exchanger with the second heat exchanger.

14. The HVAC system of claim 13, wherein the refrigeration loop further includes a compressor, a front condenser, and a third heat exchanger.

15. The HVAC system of claim 14, wherein the first heat exchanger is a first evaporator and the third heat exchanger is a second evaporator.

16. A control system for a heating, ventilation, and air condition (HVAC) system for a vehicle comprising:
   a housing defining a first airflow inlet, a second airflow inlet, and an airflow outlet, wherein a wall extends continuously from the first airflow inlet and the second airflow inlet to an entrance of a first heat exchanger and defines a first flow chamber and a second flow chamber, the first flow chamber having a cross-sectional area equal to a cross-sectional area of the second flow chamber, the flow from the first airflow inlet moving through the first flow chamber, and the flow from the second airflow inlet moving through the second flow chamber;
   a control module in communication with a first door actuator and a second door actuator,
   wherein the control module activates the first door actuator to move a first door from a first position to a second position, the first position preventing flow from the second inlet branch to the first heat exchanger and routing the flow around the heat exchanger, the second position permitting flow from the second inlet branch to the first heat exchanger, the first door pivoting about a first axis separated from the wall, the first door contacting the wall when in the first position and being separated from the wall in the second position, the first door contacting the housing in the second position and extending from the housing to the heat exchanger to define the second flow chamber and to provide separated flow from the first inlet branch and the second inlet branch into the heat exchanger, and when the first door is in the second position, the cross-sectional area of the first flow chamber being equal to the cross-sectional area of the second flow chamber at an entrance to the heat exchanger, the control module activates the second door actuator to move a second door from a first position preventing flow to a second heat exchanger to a second position permitting flow to the second heat exchanger, and when the control module activates the first door actuator to position the first door in the first position, airflow is routed around the first heat exchanger by a bypass passage.

17. The control system of claim 16, wherein the control module activates the first door actuator to position the first door in the first position when an external temperature of the vehicle is less than a temperature threshold.

18. The control system of claim 17, wherein the temperature threshold is −5 degrees Celsius.

19. The control system of claim 17, wherein the control module receives the external temperature from an outdoor temperature sensor.

20. The control system of claim 16, wherein the control module activates the second door actuator to position the second door in the first position when a target temperature is less than a temperature inside a vehicle compartment.

* * * * *